United States Patent [19]

Monsell

[11] Patent Number: 4,682,262
[45] Date of Patent: Jul. 21, 1987

[54] BATTERY CHARGER SPARK SUPPRESSOR

[75] Inventor: Kurt Monsell, Portville, N.Y.

[73] Assignee: Acme Electric Corporation, Olean, N.Y.

[21] Appl. No.: 830,344

[22] Filed: Feb. 18, 1986

[51] Int. Cl.$^4$ .............................................. H02H 7/18
[52] U.S. Cl. ........................................ 361/6; 361/11; 361/58; 320/40
[58] Field of Search .................... 361/2, 6, 10, 11, 15, 361/58; 320/39, 40

[56] References Cited

U.S. PATENT DOCUMENTS

| | | | |
|---|---|---|---|
| 3,075,124 | 1/1963 | Bagno | 361/6 |
| 3,614,464 | 10/1971 | Chumakov | 361/6 |
| 3,729,655 | 4/1973 | Gratzke | 361/6 |
| 3,781,631 | 12/1973 | Nelson et al. | 320/39 X |
| 3,912,941 | 10/1975 | Passarella | 361/8 |
| 4,025,820 | 5/1977 | Penrod | 361/8 |
| 4,062,051 | 12/1977 | Way | 361/6 |
| 4,241,369 | 12/1980 | Ikawa | 361/8 |
| 4,251,845 | 2/1981 | Hancock | 361/8 |
| 4,383,212 | 5/1983 | Ballman | 320/39 X |
| 4,602,204 | 7/1986 | Hose | 320/39 X |

Primary Examiner—A. D. Pellinen
Assistant Examiner—Derek S. Jennings
Attorney, Agent, or Firm—Pearne, Gordon, McCoy & Granger

[57] ABSTRACT

A spark suppression circuit for a battery charger includes a large filter capacitor connected in series with a semiconductor switch across the terminals of the battery charger. The battery charger does not have any output voltage even though the input is energized because the circuit includes a device to delay supplying of voltage until after the charger output terminals are connected to a battery to be charged. The semiconductor switch is non-conductive until the battery charger output terminals are actually connected to the battery to be charged. At this time, a bias circuit connected across the charger output terminals supplies a bias to turn on the semiconductor switch so that only at that time is the filter capacitor connected across the charger output terminals, and hence this suppresses the possibility of a spark upon connection of the charger output terminals to the battery to be charged.

14 Claims, 1 Drawing Figure

BATTERY CHARGER SPARK SUPPRESSOR

BACKGROUND OF THE INVENTION

A number of prior patents have addressed the problem of minimizing arcing or sparking. An early use for such circuits was in connection with attempting to limit the arcing at contacts of a switch as the switch was opened or closed, for example, in U.S. Pat. No. 3,075,124, which utilizes a transistor in series with the switch. U.S. Pat. No. 3,614,464 is also concerned with suppressing arcs at contacts and utilizes a semiconductor switch in series with one set of contacts and in parallel with another set of contacts.

More recently, circuits to protect a switching transistor which is attempting to turn off an inductive load have been devised, for example, as shown in U.S. Pat. No. 3,729,655. U.S. Pat. No. 3,912,941 also utilizes a transistor to minimize arcing across contacts, in this case, of a relay. U.S. Pat. No. 4,025,820 is directed to a circuit attempting to minimize arcing at contacts as the contacts are opened.

U.S. Pat. No. 4,062,051 utilizes a thyristor in series with a battery-energized load which is stated to prevent significant arcing across partially open contacts.

U.S. Pat. No. 4,241,369 utilizes a thyristor in a circuit for charging a capacitor in an electronic flash unit and detects the presence of an arc across the mechanical switch contacts to turn off the thyristor.

U.S. Pat. No. 4,251,845 utilizes a triac and thyristors to suppress the arc across load carrying contacts of a relay.

SUMMARY OF THE INVENTION

Battery chargers in the past have usually been constructed to operate from commercial power frequencies, for example, 50 or 60 Hz, to reduce this voltage, e.g., through a stepdown transformer, rectify it, and supply 60 Hz pulses to the battery to be charged if the battery charger is a simple half-wave rectifier, or to supply 120 Hz pulses to the battery to be charged if it is a full-wave rectifier. At these low frequencies, the stepdown transformer is large and heavy. Also in a typical battery charger for home use, the output terminals of the battery are supplied with a 6 or 8-feet long pair of cables with spring clips on the ends for attachment to the battery, such as a lead-acid automotive battery. If an attempt is made to utilize a high frequency switching power supply, operating at 20–50 KHz, for example, as a replacement for the commercial power frequency power supply, the size and weight of the transformer will be greatly reduced, yet the inductive reactance of the 6 to 8-feet long battery charger output leads becomes a serious obstacle if any ripple at 20–50 KHz is present on the output terminals of the battery charger.

Accordingly, the problem to be solved is how to construct a battery charger which will be operable at high frequencies to save space and weight in the transformer, yet eliminate the inductive reactance drop in the battery cables by utilizing a large filter capacitor connected in series with a semiconductor switch across the battery charger output terminals. When the battery charger cable clips are connected to the battery to be charged, the possibility of a spark at such terminals is suppressed by the circuit of the present invention.

Accordingly, the problem is solved by a spark suppression circuit for a battery charger having first and second output terminals comprising, in combination, a semiconductor switch having first and second main electrodes and a control electrode, a large filter capacitor, means connecting said capacitor in series with said main electrodes and connected across said first and second output terminals of said battery charger, said first and second output terminals adapted to be connected to a battery to be charged, means to delay supplying a voltage from said charger output terminals even though the charger may be energized until after said charger output terminals are connected to a battery to be charged, a bias circuit connected to said control electrode and one of said main electrodes and connected to the charger output terminals to develop a voltage from the battery to be charged to turn on said semiconductor switch, and said bias circuit having an impedance across the battery terminals at least one order of magnitude greater than the impedance of said filter capacitor and semiconductor switch thereby to suppress the possibility of a spark upon connection of said charger output terminals to a battery to be charged.

Accordingly, an object of the invention is to provide a spark suppressor circuit for a battery charger wherein a large filter capacitor is adapted to be connected across the battery charger output terminals.

Another object of the invention is to provide a battery charger with a spark suppressor circuit so that any spark or arc is inhibited when the battery charger output is connected to the battery to be charged.

A further object of the invention is to provide a battery charger with an output filter capacitor connected in series with a semiconductor switch, which is turned on only after the battery charger is connected to the battery to be charged.

Other objects and a fuller understanding of the invention may be had by referring to the following description and claims, taken in conjunction with the accompanying drawing.

BRIEF DESCRIPTION OF THE DRAWING

The single FIGURE is a schematic diagram of a battery charger embodying the invention.

DESCRIPTION OF THE PREFERRED EMBODIMENT

Figure 1:
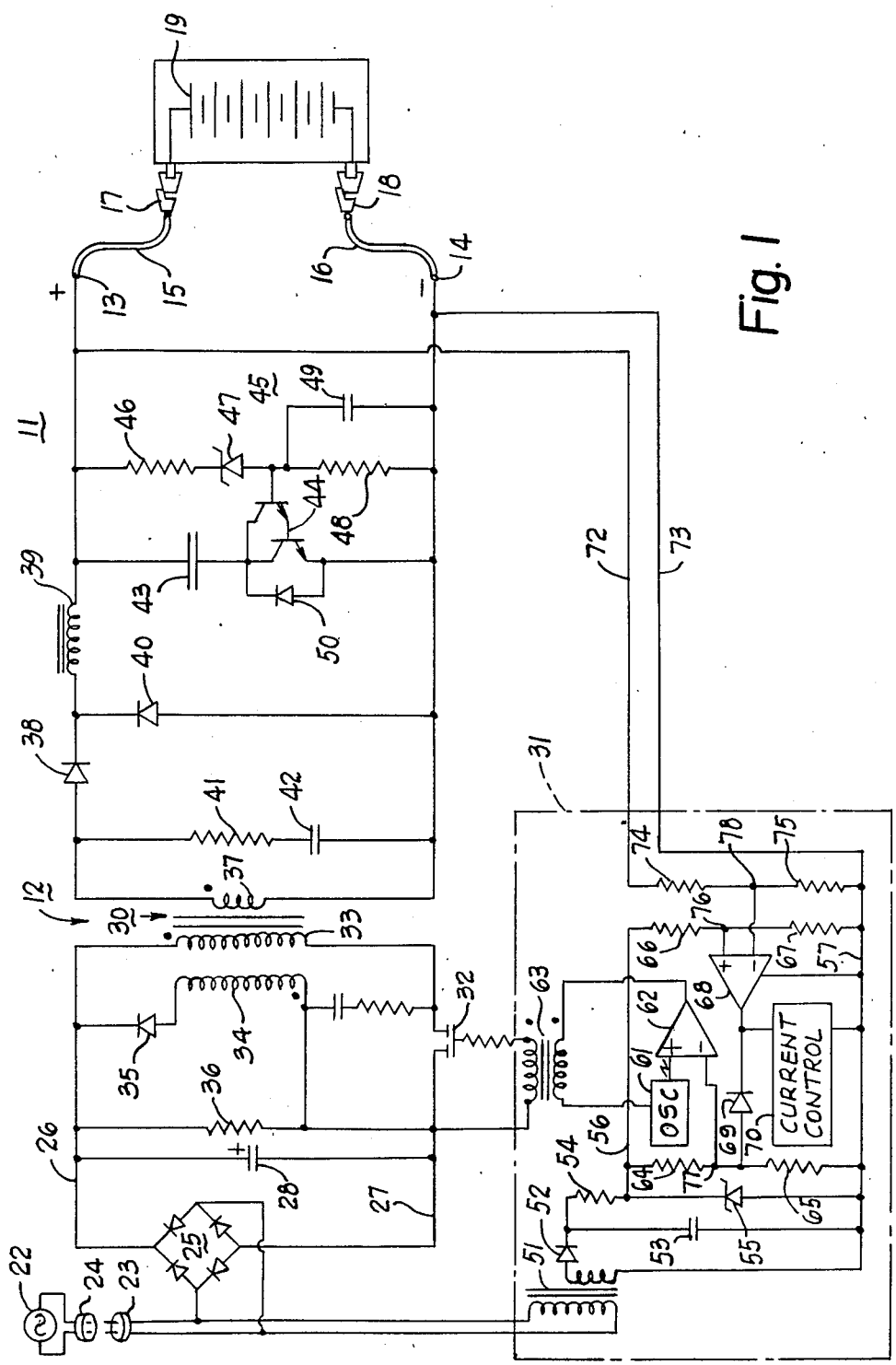

The drawing shows a spark suppression circuit 11 for a battery charger 12 which has first and second output terminals 13 and 14, respectively. These terminals are positive and negative, respectively, and have first and second output cables 15 and 16 ending in spring clips 17 and 18, respectively, connectable to terminals of a battery 19 to be charged by the battery charger 12. The battery charger 12 may be for home use, and accordingly would have suitable length battery cables 15 and 16, for example, six to eight feet long, for use by the owner in recharging a battery in his household appliances or automobile. In such case, the battery would be the typical lead-acid battery of 12.6 volts.

The battery charger 12 is energizable from any source 22, and typically this will be the commercially available voltage source of 110–120 volts AC at 50–60 Hz. The battery charger is provided with a cord and plug set 23 to be plugged into an electrical outlet 24. A rectifier bridge 25 supplies a rectified voltage positive on a conductor 26 relative to conductor 27 and filtered by a filter capacitor 28.

The battery charger 12 includes a forward converter to convert this high voltage DC into a lower voltage DC suitable for charging the battery 19. This forward converter includes a stepdown transformer 30 which operates at a high frequency, e.g., 20-50 KHz, supplied by a control circuit 31 to a transistor 32. This transistor is shown as a power field effect transistor and is caused to conduct at the high frequency rate and passes current through a primary winding 33 of the transformer 30. When the transistor 32 is not conducting, the transformer 30 resets by current flow through another primary winding 34, a diode 35, and a resistor 36 across the conductors 26 and 27. The transformer 30 does not have an air gap in the core, but is one with a hysteresis loop at about a 30-degree angle to the vertical. This transformer has a secondary winding 37 which is polarized so that the upper ends of windings 33 and 37 are simultaneously positive, and the secondary current is passed through a forward diode 38 through an inductive input filter inductance 39 to the charger positive terminal 13. When the transistor 32 is not conducting, the inductance 39 attempts to keep the current flowing and the inductive voltage thereof reverses to cause current flow in the same direction through the battery 19 and through a back diode 40. A small resistor 41 and small capacitor 42 are connected across the secondary winding 37 to suppress voltage spikes on the diodes 38 and 40.

The spark suppression circuit 11 is connected permanently across the output terminals 13 and 14 of the battery charger 12. This spark suppression circuit is to suppress sparks which would otherwise be caused by the presence of a large filter capacitor 43 as the clips 17 and 18 are connected to the battery 19. If the large filter capacitor 43 were connected directly across the output terminals 13 and 14, it is well known that just as the connection to the battery was about to be made, a spark would be drawn between the battery terminal and the spring clip because the large capacitor would act essentially as a short circuit at that instant. To suppress this spark, and in the preferred embodiment to completely eliminate it, the spark suppression circuit is incorporated in the output of this battery charger. The spark suppression circuit 11 includes a semiconductor switch 44, shown as a transistor and specifically is a Darlington transistor. This semiconductor switch is connected in series with the filter capacitor 43 across the output terminals. A bias circuit 45 is provided for the transistor 44 and is connected to the control electrode of the transistor, and also to one of the main electrodes of the transistor, in this case the emitter electrode. The bias circuit includes a resistor 46 and a Zener diode 47 connected in series between the positive charger terminal 13 and the base of transistor 44. A resistor 48 and a capacitor 49 are connected in parallel and connected between the base of transistor 44 and the negative charger terminal 14. A diode 50 is connected in reverse across the main electrodes of transistor 44.

The control circuit 31 is energized by a flexible cord and plug set 23 from the AC source 22 and includes a stepdown transformer 51, diode 52, and capacitor 53 to establish a DC operating voltage. A resistor 54 and Zener diode 55 are connected across this capacitor 53 to supply a regulated voltage on a conductor 56 relative to a common conductor 57. The control circuit 31 further includes an oscillator 61, in this case a sawtooth voltage oscillator at about 45 KHz, which supplies a signal at this frequency through a driver amplifier 62 to an isolation transformer 63, and through this transformer to the control electrode of the transistor 32 to turn it on. The driver amplifier has an inverting input connected to the junction 77 of voltage dividing resistors 64 and 65 connected across conductors 56 and 57. Also connected across these conductors is another voltage dividing pair of resistors 66 and 67 with a junction 76 therebetween connected to a voltage limit comparator 68, the output of which is also connected to the junction of the resistors 64 and 65. This connection is through a reversely polarized diode 69. A current control circuit 70 is also connected between the output of the comparator 68 and the common conductor 57. Conductors 72 and 73 are connected to the charger output terminals 13 and 14 and supply the voltage thereof to the control circuit 31 across voltage dividing resistors 74 and 75. The junction 78 of these two resistors is connected to the inverting terminal of the comparator 68. The control circuit 31 provides a means to delay supplying a voltage from the charger 12 at the output terminals 13 and 14 until after these output terminals are connected to a battery 19 which is to be charged.

The spark suppression circuit 11 works in conjunction with the battery charger 12 to suppress any sparks as the spring clips 17 or 18 are connected to the battery which is to be charged. The battery charger 12 may be for home use for charging an automotive battery, for example, and the cables 15 and 16 may be the customary length of 6 to 8 feet. Normally, the instructions with a battery charger are to make and break the final electrical connection at the 120-volt AC circuit, namely the plug and cord set 23 plugged into the outlet 24. However, in this invention, it is not material whether the battery charger 12 is energized from the AC source 22 prior to or after the charger spring clips are connected to the battery; the spark suppression circuit 11 is still operative to suppress sparks. In the normal low cost home battery charger, there is present on the output terminals a low frequency ripple at 60 or 120 Hz. Also in such low cost, low frequency battery chargers, there is no output filter capacitor corresponding to capacitor 43; instead, the charger merely supplies recharging current to the battery when the peaks of the charger output ripple voltage exceed the terminal voltage of the battery. In some battery chargers, an output filter capacitor similar to capacitor 43 is utilized to smooth such 60 Hz or 120 Hz ripple, yet this can be a dangerous practice. The lead-acid battery can gas and generate hydrogen, and any sparks as the spring clips 17 or 18 are connected to such gassing battery, can create the danger of explosion. An attempt to connect the spring clips 17 or 18 to a battery where the charger has an output filter capacitor connected across the output terminals is thus dangerous because such large filter capacitor acts as essentially a short circuit and will normally draw a spark just before the last spring clip connection is made. In the spark suppression circuit 11 of the present invention, the large filter capacitor 43 can not do this because it is connected in series with a semiconductor switch 44 which is non-conductive, and hence an open circuit, at the time that the spring clips 17 and 18 are connected to the battery 19. This is true whether or not the battery charger 12 is energized from the AC source 22. When the battery charger 12 is not energized from the AC source 22, it is easy to determine that the semiconductor switch 44 is non-conductive at the time that the charger clips are connected to the battery. When this connection to the battery is made, current cannot flow through the large filter capacitor 43 because the transistor 44 is non-conductive. A small current will flow, however, through the bias circuit 45, but only if the battery voltage exceeds the breakdown voltage of the Zener diode 47. For a 12.6-volt nominal voltage of the battery 19, this breakdown voltage may be 6.8 volts, for example. This prevents supplying any charging current to the battery which is defective with dead or reversed cells therein, and hence would not be able to take a charge. Assuming that the battery voltage exceeds the breakdown voltage, current will flow through this bias circuit to begin to charge the relatively small capacitor 49. When the voltage across capacitor 49 reaches a sufficiently high voltage, e.g., about 0.7 volts, the transistor 44 is turned on, and only then will current flow through the large filter capacitor 43. This may be a short time delay, e.g., 0.03 seconds, for a soft start of the charging of this filter capacitor from the voltage of the battery 19. The value of capacitor 49 is chosen to provide the soft start of transistor 44, with a long enough time delay to ensure that the spring clips 17 and 18 are really attached, and have not just been tapped to the battery terminals. The values for resistors 46 and 48 and Zener diode 47 are chosen so that the output ripple voltage will not affect operation. The value of the output filter capacitor 43 is a function of the particular switch mode design. Transistor 44 is a high-gain darlington type which requires very little current to drive into saturation, making it look like a closed switch. During normal operation, diode 50 is present to allow a path for current to discharge through the output capacitor 43, because current must both enter and leave this capacitor for proper filtering of the output voltage.

Even if the battery charger 12 is energized from the AC source 22 prior to connection to the connection of the clips 17 and 18 and the battery 19, the action of the spark suppression circuit 11 is the same as described above. This is because there is no voltage through the charger to the output terminals 13 and 14 merely by the energization of the input of the charger. There is a DC voltage developed across the conductors 26 and 27; however, this voltage is not passed by the stepdown transformer 30 and so no charger voltage is developed at the output terminals 13 and 14. In order for this charger to develop output voltage, it first must be connected to the battery 19, and then the voltage thereof is supplied by the conductors 72 and 73 to the control circuit 31. The energization of this control circuit from the AC source 22 means that there will be a DC voltage developed across the conductors 56 and 57, and the oscillator 61 will be producing a sawtooth voltage at 45 KHz, for example. So long as the battery clips 17 and 18 are not connected to the battery 19, there will be no voltage across conductors 72 and 73, and therefore junction 78 will be low and the output of the comparator 68 will be high. This will not be passed by the reverse polarity diode 69; therefore, junction 77 will be a high, higher than the maximum output voltage of the oscillator 61. Therefore, the output of the driver amplifier 62 will remain low, passing nothing to the isolation transformer 63. The transistor 32, therefore, will remain off and no voltage will be passed by the transformer 30 and no output voltage developed by the battery charger 12. However, as soon as the spring clips are connected to the battery 19, there will be a voltage developed across the battery charger output terminals 13 and 14 from this battery, and this will be passed by conductors 72 and 73 so that junction 78 will go high. This makes the output of the comparator 68 go low, and this will be essentially a short circuit on the resistor 65 so that junction 77 goes low. This condition is applied to the inverting input of the driver amplifier 62 so that the output thereof is released from its locked-in low condition; hence, the output of this driver amplifier reflects an amplified output of the sawtooth wave of the oscillator 61. Under such condition, the sawtooth wave is applied through the isolation transformer 63 to periodically turn on the transistor 32 and the forward converter acts through the transformer 30 to supply an output voltage to the battery charger output terminals 13 and 14, and hence to charge the battery 19. The current control 70 controls the level of the potential at the output of the comparator 68 so that the sawtooth wave output from the driver amplifier 62 is clipped at a variable and controllable amplitude. If it is clipped at a high amplitude, then only the peaks of the sawtooth wave get through the driver amplifier 62, whereas if it is clipped at a lower level, the duty cycle of the transistor 32 is increased. Accordingly, to increase the current from the battery charger, the current control would go higher. This raises the potential of the junction 77 and the clipping level and the output of the driver amplifier 62 is lower; hence, the duty cycle is increased and the duty cycle of transistor 32 is increased to increase the charger output current.

The inductance 39 and capacitor 43 in the output of the battery charger 12 establish essentially a DC voltage at the battery charger output terminals 13 and 14. It is desirable to have a minimum of 45 KHz ripple because, otherwise, even the very small inductance in the 6 or 8-feet long battery cables 15 and 16 would present a high inductive reactance, to thus limit the current supply to the battery 19 and hence lower the actual battery voltage. Furthermore, since the position of these battery cables cannot be controlled by the manufacturer, this being under the control of the user, the actual voltage drop in these battery cables would not be known. By using a large filter capacitor 43, plus the series inductance 39, this 45 KHz ripple can be essentially eliminated, so that the actual current to and voltage of the battery may be closely controlled.

It will be noted that the small capacitor 49 in the bias circuit 45 is a reactance element which passes current more slowly than a resistance would pass this current, and hence this establishes a slow turn-on of the semiconductor switch 44. The bias capacitor 49 is on the order of at least ten times the impedance of the large filter capacitor 43, and in the preferred embodiment is approximately 1000 times that impedance. This assures that there will be no spark when the battery clips 17 or 18 are connected due to the presence of the bias capacitor 49 being across these charger output terminals 13 and 14.

In one battery charger constructed and operated in accordance with the invention, the circuit elements were as follows:

| Resistors | | | Semiconducturs | |
|---|---|---|---|---|
| 36 | 33 | kilo ohms | 25 | VJ648 |
| 41 | 10 | ohms | 32 | JRP740 |
| 46 | 1 | kilo ohm | 35 | A115D |
| 48 | 1 | kilo ohm | 38, 40 | SGP3040P |
| 54 | 200 | ohms | 44 | D40K2X |
| 64 | 10 | kilo ohms | 47 | 6.8 volts |
| 65 | 6.04 | kilo ohms | 50 | A115D |
| 66 | 10 | kilo ohms | 52 | IN4001 |
| 67 | 10 | kilo ohms | 55 | 9.1 volts |
| 74 | 30 | kilo ohms | 62 | LM339 |
| 75 | 10 | kilo ohms | 68 | LM339 |

-continued

| | | |
|---|---|---|
| | 69 | IN4305 |
| Capacitors | | |
| 28 | 470 | microfarads |
| 42 | 1,000 | picofarads |
| 43 | 4.700 | microfarads |
| 49 | 4.7 | microfarads |
| 53 | 2.2 | microfarads |
| Inductors | | |
| 39 | 130 | microhenries |

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. A battery charger spark suppression circuit comprising, in combination:
   first and second output terminals on said battery charger;
   a semiconductor switch having first and second main electrodes and a control electrode;
   a large filter capacitor;
   means connecting said capacitor in series with said main electrodes and connected across said first and second output terminals of said battery charger;
   means to delay supplying a voltage from said charger output terminals even though the battery charger may be energized until after said battery charger output terminals are connected to a battery to be charged;
   a bias circuit connected to said control electrode and one of said main electrodes and connected to said battery charger output terminals to develop a voltage from the battery to be charged to turn on said semiconductor switch; and
   said bias circuit having an impedance across said battery charger output terminals at least one order of magnitude greater than the impedance of said filter capacitor and semiconductor switch thereby to suppress the possibility of a spark upon connection of said charger output terminals to a battery to be charged.

2. A battery charger spark suppression circuit as set forth in claim 1 wherein said semiconductor switch is a transistor.

3. A battery charger spark suppression circuit as set forth in claim 1 wherein said semiconductor switch is a darlington transistor.

4. A battery charger spark suppression circuit as set forth in claim 1 wherein said bias circuit includes means to prevent turn-on of said semiconductor switch when the voltage of the battery to be charged is less than a predetermined value.

5. A battery charger spark suppression circuit as set forth in claim 1 wherein said bias circuit includes a breakdown voltage device having a breakdown voltage of a substantial amount which must be overcome by the voltage of the battery to be charged.

6. A battery charger spark suppression circuit as set forth in claim 1 including a Zener diode in said bias circuit.

7. A battery charger spark suppression circuit as set forth in claim 1 including spring clips connected to said output terminals of said battery charger and removably connectable to a battery to be charged.

8. A battery charger spark suppression circuit as set forth in claim 1 wherein said capacitor and semiconductor switch are permanently connected across said output terminals of said battery charger.

9. A battery charger spark suppression circuit as set forth in claim 8 wherein said capacitor is a part of an inductive-capacitive filter to smooth pulses in the output of said battery charger.

10. A battery charger spark suppression circuit as set forth in claim 9 wherein said inductive-capacitive filter is an inductive input filter.

11. A battery charger spark suppression circuit as set forth in claim 1 wherein said bias circuit includes a reactance element passing current more slowly than a resistance to establish a slow turn-on of said semiconductor switch upon connection to a battery to be charged.

12. A battery charger spark suppression circuit as set forth in claim 11 wherein said reactance element is a bias capacitor connected between said control electrode and said one of said main electrodes.

13. A battery charger spark suppression circuit as set forth in claim 12 wherein the impedance of said bias capacitor is at least one order of magnitude greater than the impedance of said filter capacitor.

14. A battery charger spark suppression circuit as set forth in claim 12 wherein the impedance of said bias capacitor is on the order of one thousand times the impedance of said filter capacitor.

* * * * *